United States Patent
Bitter et al.

[11] Patent Number: 5,338,072
[45] Date of Patent: Aug. 16, 1994

[54] GASTIGHT CONNECTION BETWEEN TUBES OF SMALL DIAMETER

[75] Inventors: Dieter Bitter, Finnentrop; Eberhard Bornkessel, Sundern; Horst Schnabel, Neuenrade, all of Fed. Rep. of Germany

[73] Assignee: Krupp VDM GmbH, Werdohl, Fed. Rep. of Germany

[21] Appl. No.: 885,478

[22] Filed: May 19, 1992

[30] Foreign Application Priority Data

Jun. 15, 1991 [DE] Fed. Rep. of Germany ....... 4119759
Feb. 6, 1992 [DE] Fed. Rep. of Germany ....... 4203329

[51] Int. Cl.$^5$ ............................................. F16L 13/02
[52] U.S. Cl. ................................... 285/286; 285/331; 285/332; 228/198
[58] Field of Search ............... 228/198; 285/173, 286, 285/287, 332, 334.5, 331

[56] References Cited

U.S. PATENT DOCUMENTS

| | | |
|---|---|---|
| 334,925 | 8/1867 | Jayne . |
| 396,013 | 1/1889 | Thomson ........................ 285/286 X |
| 1,810,091 | 6/1931 | Siegle ............................ 285/286 |
| 2,760,346 | 8/1956 | Grenell . |
| 2,977,675 | 4/1961 | Simms ........................... 285/286 X |
| 2,987,329 | 6/1991 | Barton ........................... 285/287 X |
| 3,535,767 | 10/1970 | Doherty et al. ................. 285/331 |
| 3,830,262 | 8/1974 | Lago . |
| 4,002,359 | 1/1977 | Lari ............................... 285/331 |
| 4,039,453 | 5/1978 | Jenkins . |
| 4,331,286 | 5/1982 | Miyazaki et al. ............... 228/198 |
| 4,943,000 | 7/1990 | Raynaud et al. ............... 228/198 X |

FOREIGN PATENT DOCUMENTS 1908888 4/1970 Fed. Rep. of Germany .

Primary Examiner—Dave W. Arola
Attorney, Agent, or Firm—Meltzer, Lippe, Goldstein, Wolf, Schlissel & Sazer

[57] ABSTRACT

The invention relates to a gastight connection between tubes of small diameter of metals or metal alloys having different melting points, more particularly copper and aluminium, wherein the end zone of the first tube (1) is opened out and the second tube (2) of a lower-melting material is inserted and soldered into the opened-out portion (3), the internal generated surface of the opened-out portion (3) merging via an internal cone (4) and extension (38) into that zone of the first tube (1) which is not opened out, a sleeve (34) of special steel possibly being inserted in the end zone of the second tube (2).

7 Claims, 5 Drawing Sheets

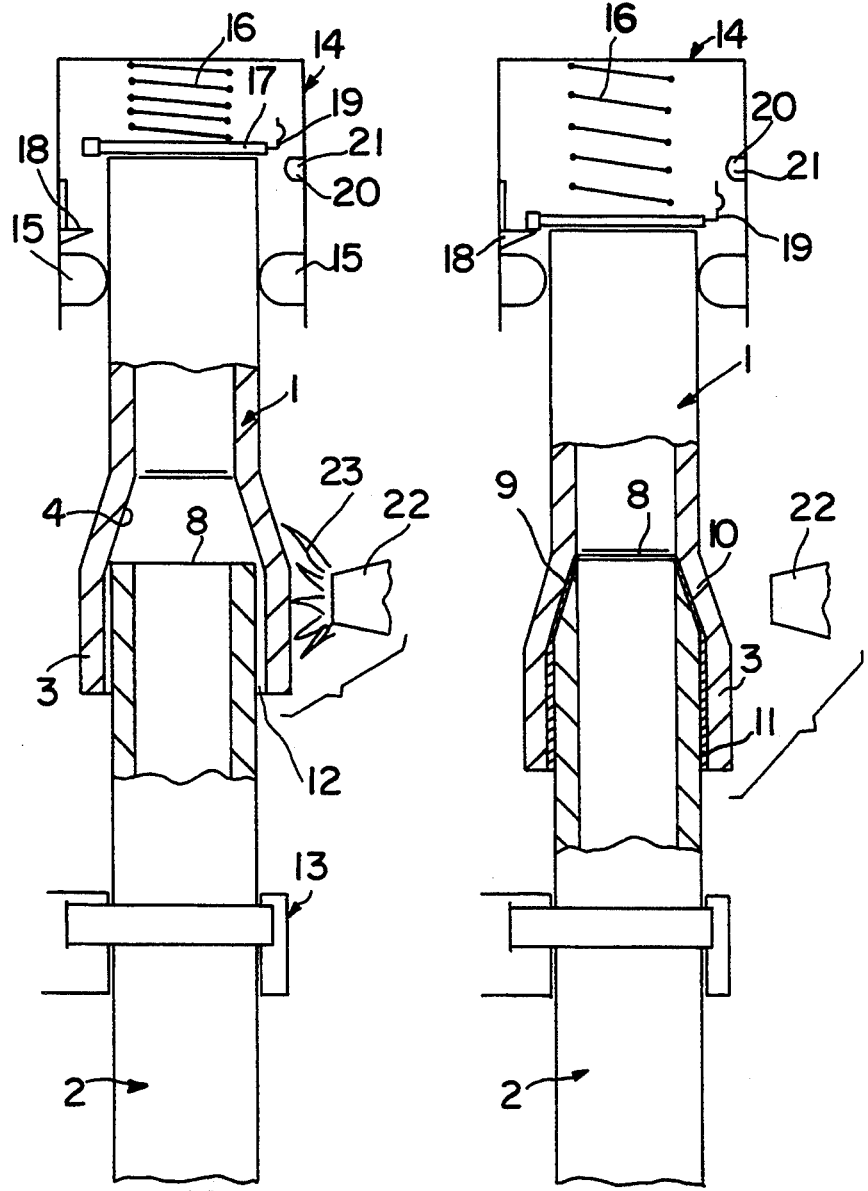

GASTIGHT CONNECTION BETWEEN TUBES OF SMALL DIAMETER

BACKGROUND OF THE INVENTION

The invention relates to a gastight connection between tubes of small diameter of metals or metal alloys having different melting points, wherein the end zone of the first tube is opened out and the end of the second tube is inserted into the opened-out portion, and wherein an originally existing soldering gap between the opened-out portion and the inserted second tube is filled with a material having a lower melting point than the metal or metal alloy.

A connection of the kind specified is publicly known to have been used in the form of an aluminium tube which is opened out at its end and into which a copper tube is inserted. The insertion connection is made with high precision, namely a very narrow soldering gap, to enable the opened-out portion and the pipe end to be directly interconnected under heat without the supply of outside solder. The connection itself is more a diffusion welding connection than a soldered connection.

German OS 1 908 888 discloses another tube connection system wherein the tube ends are indirectly connected via a tube socket with conical insertion ends and wherein an inserted piece of soldering material must always be provided in the soldering gap.

Since the aforedescribed direct connection of a copper tube to an aluminium tube calls for high precision in production, electric butt pressure welding is also still used for connecting the end faces of the tubes of different materials, with the consequent inevitability of the extra production steps of external and internal deburring, flushing out of the internal chips and drying.

Another technical disadvantage of butt pressure welding is that at present adequate production safety demands a tube diameter of 7.5 mm for a wall thickness of approximately 1 mm, although more particularly for such Cu/Al tube connections and their various utilizations a diameter range of at most approximately 6.5 mm would be desirable.

It is an object of the invention to obviate the aforedescribed disadvantages of the prior art and to provide a reliably gastight tube connection between tubes of materials having different melting points, more particularly between a copper tube and an aluminium tube. It is an object of the invention to provide a suitable production process and a corresponding installation for the production of the gastight connection.

SUMMARY OF THE INVENTION

According to the invention, therefore, the first tube having the opened-out portion is made of the metal or metal alloy having the higher melting point; the cylindrical internal generated surface of the opened-out portion merges via an internal cone into that zone of the inner wall of the first pipe which is not opened out; the end of the second tube has a corresponding conical annular face bearing against the internal cone, and the boundary layer or the end of the second tube adjacent the internal cone and forming the annular face, and the filling of the soldering gap are materials of the second tube melted in situ and resolidified.

Such a tube connection according to the invention is reliably hermetic and can be made between materials which can hardly be reliably directly soldered to one another as is, for example, the case between copper and aluminium. The annular face bearing tightly against the internal cone primarily provides sealing, while the solidified material in the gap between the opened-out portion and the tube end ensures the necessary strength of the connection.

Claim 2 discloses as a preferred combination of materials that the first tube, having the opened-out portion, is a copper tube and the second tube is an aluminium tube.

In the zone of the inner place of transition, in serial production the resulting connection can lead either to a slight circularly extending indentation or to a small circularly extending internal bead; this is usually unimportant in comparison with flash in butt welding, but it may cause some throttling in tubes of small diameter. However, during renewal of the connection during repair work on, for example, a refrigerator, it is extremely difficult to maintain precisely enough heating for soldering and the feed of the lower-melting tube, so that the tube connection itself can be repaired only in exceptional cases, whole circuits having to be interchanged to make sure that a repair performed does not narrow the cross-section excessively. An internal bead must be avoided as far as possible in the case of a tube diameter of 7.5 mm (with an approximate wall thickness of 1 mm) or for the diameter range around at most 6.5 mm required for special purposes.

These requirements are met by a further development of the invention as set forth in claim 3, namely that inserted in the end zone of the second tube is a metal sleeve which is adapted to the internal diameter of the second tube and which has contact with said second tube and which extends beyond the end face of the second tube into the first tube and which is made of a material having a higher melting point than the metal or metal alloy of which the second tube is made.

Also according to claim 4 the sleeve is made of steel and has a smaller wall thickness than the tubes to be connected.

According to a feature of the invention set forth in claim 5, the tube connection is so constructed that an extension and at its end a short transition cone to the zone of the first pipe which is not opened out are disposed between the internal cone and the start of the zone of the first tube which is not opened out, the external diameter of the sleeve is larger than the internal diameter of the zone of the first tube which is not opened out and smaller than the internal diameter of the extension, and a longitudinal portion of the sleeves is disposed in the extension.

In this way a change of flow cross-section at the place of the connection can be minimized or completely obviated with a suitable dimensioning of the widened portion, whose internal diameter as a rule only slightly exceeds the internal diameter of the zone of the tube which is not opened out. The short transition cone at the end of the widened portion can be used as an axial stop for the advance of the sleeve when the connection is produced.

Furthermore, the second tube has a wall indentation forming an internal stop for fixing the sleeve in a position coaxial with the tube.

The internal diameter of the sleeve, adapted to the overall conditions, now determines the internal diameter in the transitional zone and completely obviates the risk of any internal bead formation. A precautionary internal check on the finished tube connection is therefore also rendered superfluous. The incorporated sleeve ensures that any fluctuations in operational conditions during the production of the tube connection or inadequacies of preparation at a building site do not affect the maintenance of a given internal diameter in the transitional zone of the two tubes.

The feature of claim 7 is mainly used in the production of refrigerating apparatuses, namely the second tube is the suction tube of an evaporator of a compressor/refrigerating apparatus and the first tube is a connecting tube to the suction side of the compressor.

The preamble of claim 8 sets forth a process for producing a gastight tube connection between a first tube of a higher-melting metallic material, more particularly a copper tube, and a second tube of lower-melting metallic material, more particularly an aluminium tube, the first tube being opened out at its end and the end of the second tube being inserted into the opened-out portion receiving the second tube with a welding gap size clearance, whereafter the insertion connection is heated and the soldering gap closed.

The precise features of this process are the higher-melting tube is opened out and an internally conical transition is produced between the cylindrical opened-out portion and the adjoining zone of the tube; possibly the end zone of the lower-melting tube is wetted with a fluxing agent on the outside and the opened-out portion on the inside; the end zone of the lower-melting tube is inserted into the opened-out portion of the higher-melting tube until it abuts the conical transition; and the opened-out portion and the conical transition are heated until the lower-melting tube partially melts in the opened-out portion, whereafter the tubes are advanced in the axial direction of the tube in relation to one another and towards one another, corresponding to a given advance, and the heat supply is discontinued.

If an internal sleeve is to be provided in the zone of the connection, according to claim 9 the metallic sleeve is inserted by a portion of its length into the end zone of the lower-melting tube, before the end zone of the lower-melting tube is introduced into the opened-out portion of the higher-melting tube.

The preamble of claim 10 starts from known installations in use, namely an installation having a clamping device for the vertical clamping of a tube, and a heat source directed at the end zone of a clamped tube lying above the clamping device.

This installation is completed according to the invention by a guide device positioned above the clamping device for a further tube aligned with the clamped tube, the guide device being vertically displaceable between adjustable positions and being retained in a top operational position by the clamped tube above the further tube disposed on the clamped tube, the guide device being under a defined applied load, and a transmitter which signals that the top operational position has been vacated in the direction of a lower operational position defined by a stop, the transmitter being connected via a control cable to the control system of the installation.

The applied load can be produced and terminated by the fact that during heating the higher-melting tube experiences the applied load of an element producing the subsequent feed, preferably a spring, the feed triggering a control signal terminating heating.

An installation can also be used in which distributed over the periphery of a carrousel are a number of clamping devices which successively by the timed rotation of the carrousel approach the associated fixed working stations, including a feeding station, a heating station and a removal station, the guide device being associated with the heating station and the rotary device of the carrousel being controlled by the transmitter via the control device, the return of the guide device to its top operational position being initiated every time with the start-up of the carrousel.

DESCRIPTION OF THE DRAWINGS

The invention will now be described by way of example with reference to the annexed partially diagrammatic drawings. The drawings show:

FIG. 2 a first working position in the production of the connection of a copper tube to an aluminium tube FIG. 3 a second working position FIG. 4 a gastight tube connection with sleeve FIG. 5 an initial phase in the production of the connection shown in FIG. 4 between a copper tube and an aluminium tube FIG. 6 an end phase in the production of said connection, and FIG. 7 a tube connection at the evaporator of a refrigerating apparatus FIG. 1 shows a gastight connection between a first tube 1 of copper and a second tube 2 of aluminium. The two tubes 1, 2 are shown solely in their connecting zone, the first tube 1 being shown partially and the second tube 2 completely in section.

Figure 1:
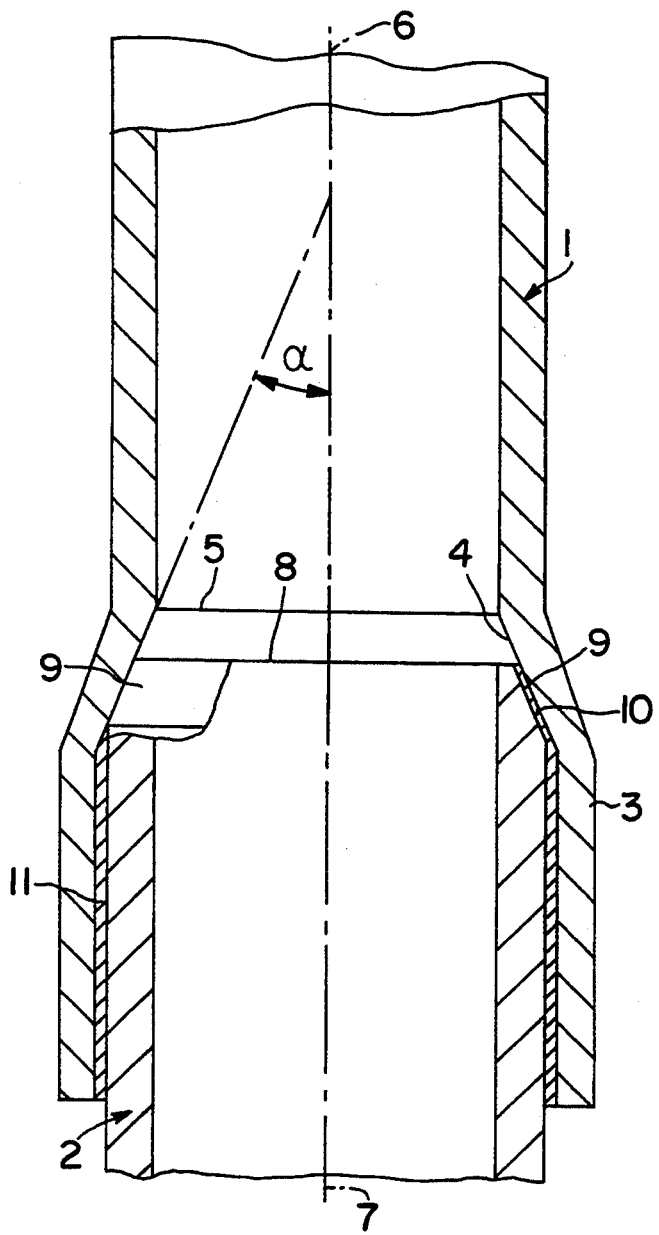
FIG. 1 a gastight tube connection

At its end zone the first tube 1 has an opened-out portion 3, the cylindrical internal generated surface of the opened-out portion 3 merging via an internal cone 4 at an internal transitional zone 5 into the rest of the internal generated surface of the first tube 1. One axis 6 of the first tube 1 coincides with the other axis 7 of the second tube 2.

In the embodiment here illustrated the end face 8 of the second tube 2 is still at a clear distance from the internal transitional zone 5 and from the end of the internal cone 4.

The second tube 2 bears via an annular face 9 tightly against the internal cone 4, the annular face 9 being the conical external generated surface of a boundary layer 10, which is material of the second tube 2—i.e., aluminium—which has melted in the insertion connection during its production and has resolidified. Such melted and resolidified material also forms the filling 11 of the soldering gap 12 (FIG. 2).

In this embodiment the internal cone 4, which substantially produces the gastight seal in the zone of contact with the annular face 9, has an angle of inclination $\alpha$ to the axis 6 of the first tube 1 of approximately 30°.

As a whole, to make the drawing clearer FIG. 1 is shown to an enlarged scale and therefore not to the true scale. This applies more particularly to the thickness of the filling 11 and of the boundary layer 10. In a tube connection produced according to the invention a copper tube having a diameter of 6 mm and a wall thickness of 0.65 mm had been opened out to such an extent that an aluminium tube 7×1 mm could be readily inserted. The soldering gap 12 (cf. FIG. 2) between the opened-out portion 3 and the end of the second tube 2 was approximately 0.2 mm. In production this soldering gap 12 is adjusted to 0.05 to 0.2 mm.

FIG. 2 shows the production of a tube connection in a first phase and FIG. 3 in a second phase, the soldering gap 12 being again shown to an excessive scale to make the drawing clearer. However, this makes it possible to demonstrate how, when the tubes 1, 2 are joined together, due to a flash on the end face 8 of the second tube 2 for a non-circularity of its front end, the tube 2 does not fit over its whole periphery on to the internal cone 4. However, this has no effect on the production of the tube connection.

FIG. 2 shows the second tube 2 clamped in a clamping device 13 which retains the second tube 2 in an axially predetermined position. The first tube 1, a short tubular member, is fitted from above on to the second tube 2.

The top end of the first tube 1 bears slidably against lateral guide elements 15 in an upwardly or outwardly hingeable guide casing 14. A prestressed spring 16 acts on a guide device 17, thereby placing the first tube 1 under a downwardly directed applied load.

The guide casing 14 also has a stop 18 for the guide device 17, which has a triggering element 19. Attached to the guide casing 14 is a transmitter 20 with which a control cable 21 is associated.

For generating heat a gas burner 22 is provided which produces a burner flame 23.

The first tube 1 is wetted on the inside and the second tube 2 on the outside with a fluxing agent (not shown) suitable for the melting of aluminium. The first tube 1 is heated by the burner 22 in the zone of the opened-out portion 3. As soon as the opened-out portion and more particularly the conical transitional zone to the remaining part of the first tube 1 has become heated to such an extent that the second tube 2 begins to melt, at first in the zone of contact with the internal cone 4, the first tube 1 is pushed downwards under the applied load of the spring 16 and with increasing melting of the contact zone, increasing in size above the internal cone 4. Due to the melting-off at the internal cone, aluminium is released for the formation of the boundary layer 10 and for the filling 11 of the soldering gap 12.

The downward movement of the first tube 1 from its position shown in FIG. 2, in which the guide device 17 is situated in its top operational position, is bounded by the stop 18 which can be adjusted on the guide casing 14.

FIG. 3 shows the bottom operational position, in which the tube connection is produced. On its way from the top operational position, shown in FIG. 2, to the bottom operational position, shown in FIG. 3, via its triggering element 19 the guide device 17 makes contact with the transmitter 20, thereby triggering a control signal which via control line 21, for example, turns off the burner 22.

FIG. 4 again shows the gastight connection between a first tube 1 of copper and a second tube 2 of aluminium. The two tubes 1, 2 are shown solely in their connecting zone, the first tube 1 being shown substantially in section, while the second tube 2 is shown wholly in section.

In this example the end face 8 of the second tube 2 is still at a clear distance from the internal transitional zone 5 and the end of the internal cone 4.

The second tube 2 bears hermetically against the internal cone 4 via the conical annular face 9, the conical outer generated surface of the annular face 9 being a boundary layer 10 which, like the filling 11, is aluminium melted and resolidified in situ—i.e., in the insertion connection during its production.

Inserted into the end zone of the second tube 2 is a sleeve 34 bearing via its end 35 against an indentation 37 in the second tube 2. The other end 36 of the sleeve 34 is disposed in the portion of the first tube 1 which is not opened out. The sleeve 34 covers the internal connecting zone 40. The sleeve 34, frequently a sleeve of special steel, inserted with a fit into the aluminium tube, can have a very small wall thickness, since it performs no force-transmitting functions in the tube connection itself. In this case also currently available special steel sleeves having a wall thickness of approximately 0.1 mm can be used for the welding of aluminium tube connections on aluminium evaporators. As a rule the wall thickness of the sleeve 34 is substantially smaller than that of the tubes 1 and 2.

The internal cone 4, which substantially produces the gastight seal in the zone of contact with the annular face 9, has in this case an angle of inclination to the axis 6 of the first tube 1 of rather less than 30°, although, as shown by FIGS. 2 and 3, smaller angles of inclination are also possible.

Figure 4:
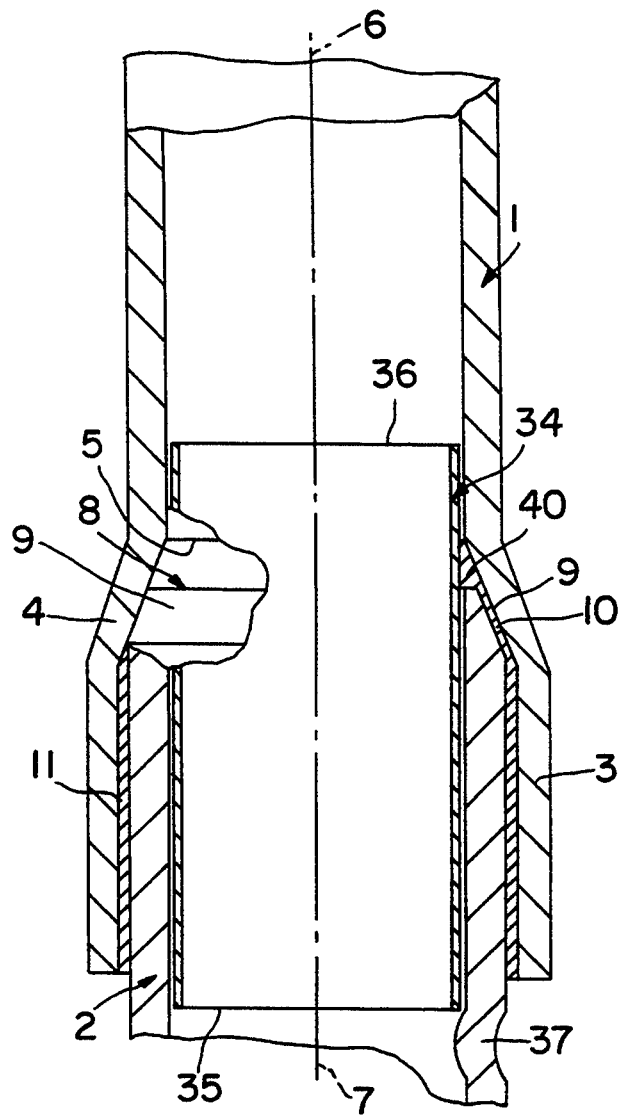

A portion of the sleeve 34 is cut out in the zone of the internal cone 4, to show the position of the end face 8 of the second tube 2 and the inner transitional zone 5 of the first tube 1. As a whole, for the sake of clarity FIG. 4 is shown to an enlarged scale, and is therefore not true to scale. This applies more particularly to the thickness of the filling 11 and of the boundary layer 10. In a tube connection produced according to the invention a copper tube having a diameter of 6 mm and a wall thickness of 0.65 mm have been opened out to such an extent that an aluminium tube $7 \times 1$ mm with a special steel sleeve $4.9 \times 0.1$ mm (70 mm in length) could be readily inserted. The soldering gap 12 (cf. FIG. 2) was approximately 0.2 mm in size.

Although one aim of the invention is to cover the lower range of small diameter tubes, the invention can also be advantageously used for tube diameters of around 30 to 40 mm.

Figure 5:
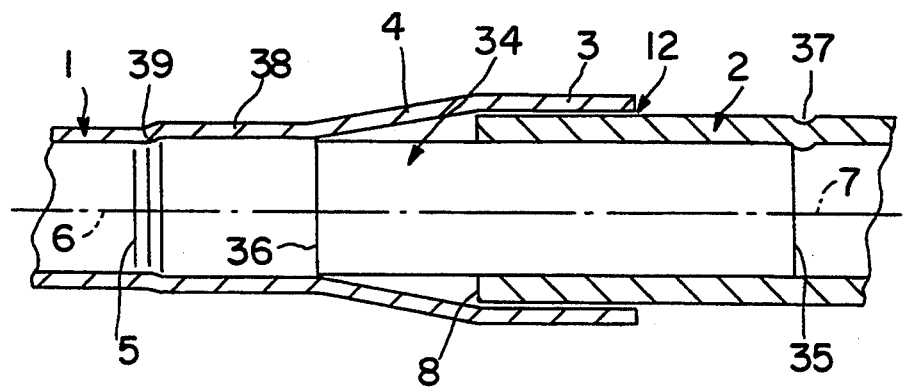
Figure 6:
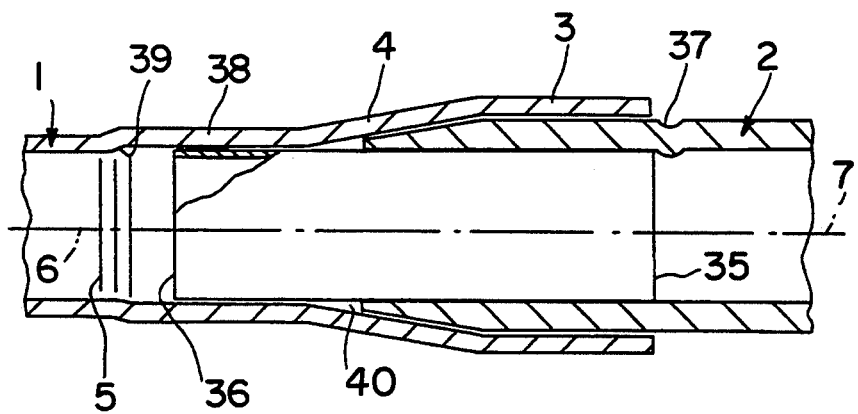

FIG. 5 shows the production of a tube connection in an initial phase and FIG. 6 in a final phase; in this case also the soldering gap 12 is shown to an excessively large scale, to clarify the drawings.

In the production phase shown in FIG. 5 the second tube 2, with the sleeve 34 bearing against the wall indentation 37, is inserted in the opened-out portion 3 and bears against the internal cone 4. The internal cone 4 is adjoined by an extension 38 which merges via a short conical transition 39 into the zone of the first tube 1 which is not opened out. Clearly, the opened-out portion 3, the internal cone 4, the extension 38 and the transition 39 can be produced in one operation, using the same opening-out tool. For example, for oval tube connections use is made of an oval mandrel and of course also an oval sleeve.

To pass from the production phase shown in FIG. 5 to that shown in FIG. 6, the opened-out portion 3 and the part of the internal cone 4 are heated until the soldering temperature, which also depends on the fluxing agent, is reached. The first tube 1 must be retained, while the second tube 2 should be under the applied load of a spring (not shown) directed at the first tube 1. Under the axial applied load the second tube 2 is pushed into the opened-out portion 3, its end face being melted off in the inward direction and filling the soldering gap 12. A residual annular space 40 must not be filled with molten material, but if this should take place and some back-up occur, the molten material is harmlessly forced outwards through the soldering gap.

In the example shown in FIG. 6 the rear end 35 of the sleeve 34 is disposed substantially in the same plane as the end of the opened-out portion 3 and the wall indentation 37 outside the opened-out portion 3, but close to the latter. The front end 36 of the opened-out portion is at a distance from the conical transition 39 at the end of the extension 38, in which a substantial part of the sleeve 34 is disposed. Alternatively, the indentation 37 might also be disposed inside the opened-out portion.

However, the dimensions can be so adapted to one another that the sleeve 34 abuts the conical transition 39.

For the rest, the sleeve 34 is shown unsectioned in FIG. 5, while it is shown partially cut open in FIG. 6.

Figure 7:
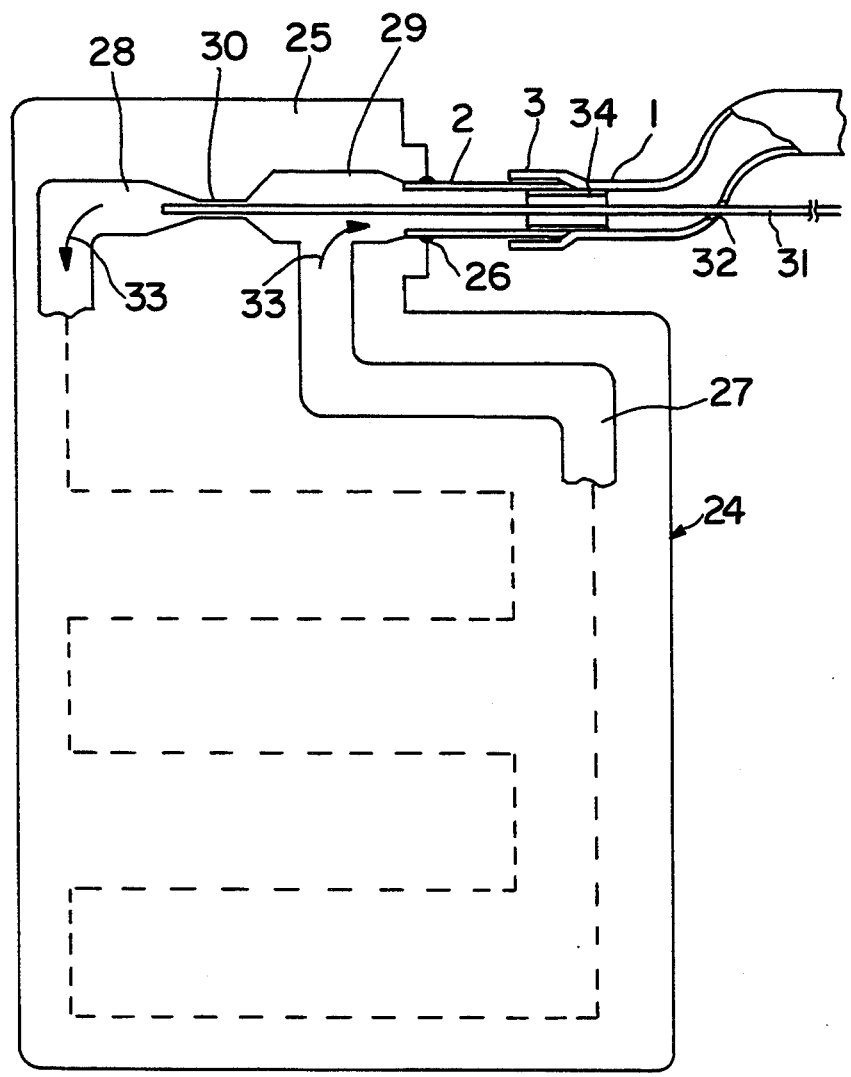

FIG. 7 shows an evaporator 24 for the coolant circuit of a compressor/refrigerating apparatus. The basic element of the evaporator 24 is a plate 25 which consists of two interconnected aluminium sheets and in which a coolant duct 27 extends meander-fashion. The second tube 2 is inserted into the plate 25 and connected thereto via a weld 26, forming the so-called suction tube connection. The suction tube connection contains the sleeve 34 in the connection of the first tube 1 to the second tube 2. In contrast with this example, in serial production preferably the design of the evaporator as shown in FIG. 6 is used.

The suction tube, namely the second tube 2, discharges into the outlet zone 29 of the coolant duct 27, whose inlet zone 28 is separated from the outlet zone 29 by a narrowed portion 30. Fitted into the narrowed portion 30 is a throttle/capillary tube 31 which extends out of the first tube 1 via an opening 32 in a bend thereof. The coolant is supplied via the throttle/capillary tube 31. Arrows 33 indicate the direction of flow. The throttle/capillary tube 31 is supplied from the pressure side of a compressor (not shown). The first tube 1 can be connected as the connecting tube to the compressor directly to the suction spigot thereof.

Within the framework of the invention the aforementioned tube materials copper and aluminium are understood to mean not only pure copper and pure aluminium, but also copper or aluminium alloys whose basic metal is mainly copper or aluminium.

We claim:

1. A gas tight connection for tubes of small diameter, comprising a first tube made from a first metallic material, said first tube comprising a cylindrical portion having a first inside diameter, a cylindrical opened-out portion axially spaced from said cylindrical portion having said first inside diameter and having a second inside diameter which is larger than said first inside diameter, and a transition portion merging said cylindrical portion and said opened-out portion, said transition portion including an internal cone extending to said first and second diameter portions, a second tube made from a second metallic material, which has a lower melting point than said first tube, said second tube comprising a cylindrical portion and an end zone which includes an annular face which corresponds to and bears against said inner cone, and a boundary layer between said annular face and said inner cone, and between said cylindrical portion of said second tube and said opened out-portion of said first tube, said boundary layer being formed from said second metallic material which has been melted in situ and resolidified to form said gas tight connection, said annular face being formed to correspond with said internal cone by inserting said end zone of said second tube into said opened-out portion of said first tube until said end zone abuts against said inner cone, heating said opened-out portion and said inner cone until a portion of said second tube in said opened-out portion partially melts, and advancing said second tube in an axial direction relative to said first tube.

2. A gastight connection according to claim 1, characterized in that the first tube (1), having the opened-out portion (3), is a copper tube and the second tube (2) is an aluminium tube.

3. A gastight connection according to claim 1, characterized in that inserted in the end zone of the second tube (2) is a metal sleeve (34) which is adapted to the internal diameter of the second tube (2) and which has contact with said second tube (2) and which extends beyond the end face (8) of the second tube (2) into the first tube (1) and which is made of a material having a higher melting point than the metal of which the second tube (2) is made.

4. A gastight connection according to claim 3, characterized in that the sleeve (34) is made of steel and has a smaller wall thickness than the tubes (1 and 2) to be connected.

5. A gastight connection according to claim 3, characterized in that an extension (38) and at its end a short transition cone (39) are disposed between the internal cone (4) and the start of the zone of the first tube (1) which is not opened out, the external diameter of the sleeve (34) is larger than the internal diameter of the zone of the first tube (1) which is not opened out and smaller than the internal diameter of the extension (38), and a longitudinal portion of the sleeves (34) is disposed in the extension (38).

6. A gastight connection according to claim 3; characterized in that the second tube (2) has a wall indentation (37) forming an internal stop for fixing the sleeve (34) in a position coaxial with the tube.

7. A gastight connection according to claim 1, characterized in that the second tube (2) is the suction tube of an evaporator (24) of a compressor/refrigerating apparatus and the first tube (1) is a connecting tube to the suction side of the compressor.

* * * * *